Patented July 4, 1939

2,165,134

UNITED STATES PATENT OFFICE 2,165,134

PROCESS OF PREPARING ENAMELS

Karl Frank, Bad Soden in Taunus, and Fritz Osterloh, Frankfort-on-the-Main-Hochst, Germany, assignors of one-half to I. G. Farbenindustrie Aktiengesellschaft, Frankfort-on-the-Main, Germany, and one-half to Eisenwerk Kaiserslautern, Kaiserslautern, Germany No Drawing. Application January 9, 1937, Serial No. 119,858. In Germany January 11, 1936

7 Claims. (Cl. 106—36.2)

This invention relates to a process of preparing enamels, for instance on cast iron or wrought iron, having a high resistance to variation of temperature.

In preparing wet enamelling masses or enamelling powders it has been the custom to add silicic acid in the form of quartz sand or powdered quartz to the enamel mixture in the mill; by this process the enamel obtained by fusing the mixture on cast iron or wrought iron resists variation of temperature better than do the enamels prepared without the addition of quartz.

It has been found that the resistance to variation of temperature exhibited by the aforesaid usual enamels, i. e. wet enamelling masses as well as enamelling powders may essentially be improved by adding to the enamel mixture substantially pure silicic acid fused and cooled to solidification such as quartz glass or quartz glass material instead of the non-fused powdered quartz. This addition to the enamel mixture may suitably be made before the milling operation. It is also possible to grind the other constituents of the enamel as such and then to add the quartz glass or quartz glass material and to mix the whole mass or even to grind the quartz glass or quartz glass material together with the other constituents. The process may also be conducted in the following manner: First, the other constituents of the enamel which have the usual constitution are intimately mixed and fused or fritted, and the fused or fritted mixture is then broken and mixed with the quartz glass or quartz glass material. The mixing may also be performed after the other constituents of the enamel have been mixed or ground with water or a binding agent. In each case it is not allowed, after the pure silicic acid fused and cooled to solidification has been mixed with the other constituents of the enamel, to heat the whole mixture to such a degree that the fused silicic acid is dissolved in the other constituents. The heating temperature may only be as high as in the usual baking process, i. e. it must be essentially lower than the melting point of the other constituents of the enamel and also lower than the melting point of pure silicic acid.

The addition of quartz glass or quartz glass material produces a mass which melts more uniformly and rapidly than a mass containing nonfused quartz; after having been fused on the surface of cast iron or wrought iron the new enamel is everywhere homogeneously glassy apart from the air particles and other particles which intentionally have been introduced for producing turbidity. The enamelling thus produced is very resistant to sudden variation of temperature. It may be used either as ground enamel or as covering enamel or as both together.

The following example serves to illustrate the invention, but it is not intended to limit it thereto:

An enamelled dish, the ground enamel as well as the three covering layers of enamel of which each contained 10 per cent. of powdered quartz glass added to the powders in the mill, was quenched in ice water after having been heated to 300° C.; no defects were noticed in the enamelled layer after this quenching operation. The test of the electrical insulation afforded by the enamel finally baked and quenched in water, also proved complete uniformity and the absence of any cracks.

In the case of dishes the enamel of which had received the powdered quartz glass merely during the fusing of the enamel masses or had received no such addition, leaks could be observed by electrical tests even when the dishes had been cooled at 80° C.; cracking and splittering off had already occurred.

We claim:

1. A process of preparing enamels of a high resistance to variation of temperature which comprises adding substantially pure silicic acid fused and then cooled to solidification to the components of the said enamel, grinding the mixture, mixing it with water or a binding agent, fusing the enamel on the articles to be covered and baking them at ordinary baking temperatures.

2. A process of preparing enamels of a high resistance to variation of temperature which comprises adding substantially pure silicic acid fused and then cooled to solidification to the components of the said enamel which previously have been ground together in a mill, grinding the mixture, mixing it with water or a binding agent, fusing the enamel on the articles to be covered and baking them at ordinary baking temperatures.

3. A process of preparing enamels of a high resistance to variation of temperature which comprises adding substantially pure silicic acid fused and then cooled to solidification to the components of the said enamel which previously have been ground in a mill, then fused or fritted and again broken, grinding the mixture, mixing it with water or a binding agent, fusing the enamel on the articles to be covered and baking them at ordinary baking temperatures.

4. A process of preparing enamels of a high resistance to variations of temperature which comprises mixing and grinding a usual enamel with water or a usual binding agent, adding substantially pure silicic acid fused and then cooled to solidification, fusing the enamel on the articles to be covered and baking them at ordinary baking temperatures.

5. A process of preparing enamels of a high resistance to variations of temperature which comprises grinding a usual enamel, fusing or sintering it, grinding it again with water or a binding agent, adding substantially pure silicic acid fused and then cooled to solidification, fusing the enamel on the articles to be covered and baking them at ordinary baking temperatures.

6. A process of preparing enamels of a high resistance to variation of temperature which comprises adding substantially pure silicic acid fused and then cooled to solidification to the components of the said enamel, applying the mixture on the articles to be covered and baking them at ordinary baking temperatures.

7. A process of preparing enamels of a high resistance to variation of temperature which comprises adding substantially pure silicic acid fused and then cooled to solidification to the components of the said enamel, powdering the mixture on the articles to be covered which have been provided previously with a ground enamel, and baking the articles at ordinary baking temperatures.

KARL FRANK.
FRITZ OSTERLOH.